United States Patent
Kuczynski et al.

(10) Patent No.: US 10,808,090 B2
(45) Date of Patent: Oct. 20, 2020

(54) METHOD AND COMPOSITION TO ENSURE DEGRADATION OF PLASTIC FILMS IN AN ANAEROBIC ENVIRONMENT, SUCH AS A LANDFILL

(71) Applicant: International Business Machines Corporation, Armonk, NY (US)

(72) Inventors: Joseph Kuczynski, North Port, FL (US); Debra Neuman-Horn, Rochester, MN (US); Joseph F. Prisco, Rochester, MN (US); Kevin J. Przybylski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 15/811,030

(22) Filed: Nov. 13, 2017

(65) Prior Publication Data

US 2018/0066119 A1   Mar. 8, 2018

Related U.S. Application Data

(62) Division of application No. 14/811,929, filed on Jul. 29, 2015, now Pat. No. 9,890,258.

(51) Int. Cl.
*B32B 3/00* (2006.01)
*C08J 5/18* (2006.01)
(Continued)

(52) U.S. Cl.
CPC ............. *C08J 5/18* (2013.01); *B29C 48/08* (2019.02); *B29C 67/247* (2013.01); *C08J 3/203* (2013.01);
(Continued)

(58) Field of Classification Search
CPC .. C08K 9/10; C08K 3/012; C08J 3/203; C08J 5/18; B29C 48/08; B29C 67/247
See application file for complete search history.

(56) References Cited

U.S. PATENT DOCUMENTS

| 3,444,155 A | 5/1969 | Fish |
| 5,321,065 A | 6/1994 | Bono et al. |

(Continued)

FOREIGN PATENT DOCUMENTS

| CN | 104231351 A | 12/2014 |
| CN | 104231416 A | 12/2014 |

(Continued)

OTHER PUBLICATIONS

Goldsberry, Clare, "FTC staff warns plastic waste bag marketers that their 'oxodegradable' claims may be deceptive," Plastics Today, Nov. 17, 2014, 2 pages, printed from <http://www.plasticstoday.com/articles/FTC-staff-warns-plastic-waste-bag-marketers-that-their-oxodegradable-claims-may-be-deceptive-141117?cid=nl.plas08.20141119> on Jun. 5, 2015.

(Continued)

*Primary Examiner* — Elizabeth E Mulvaney
(74) *Attorney, Agent, or Firm* — Matthew J. Bussan

(57) ABSTRACT

A plastic film is produced by blending a polymer with particles encapsulating an oxidizing agent, such as hydrogen peroxide. Optionally, an "oxodegradable" and/or "oxo biodegradable" additive that promotes degradation of the polymer in the presence of oxygen may be blended into the plastic film. The presence of the oxidizing agent within the plastic film ensures degradation of an article of manufacture, e.g., a plastic bag, when it is disposed of in an anaerobic environment, such as a landfill. In some embodiments, the particles are microcapsules and/or nanocapsules each having a polymer shell encapsulating a core that includes the oxidizing agent. In some embodiments, the particles are (Continued)

microparticles and/or nanoparticles each having a matrix in which the oxidizing agent is encapsulated.

15 Claims, 2 Drawing Sheets

(51) Int. Cl.
    *C08J 3/20*     (2006.01)
    *B29C 67/24*     (2006.01)
    *B29C 48/08*     (2019.01)
    *C08K 9/10*     (2006.01)
    *C08K 3/012*     (2018.01)

(52) U.S. Cl.
    CPC .............. *C08K 3/012* (2018.01); *C08K 9/10* (2013.01); *B29K 2023/06* (2013.01); *B29K 2995/006* (2013.01); *B29K 2995/0059* (2013.01); *C08J 2323/06* (2013.01); *C08K 2201/018* (2013.01)

(56) References Cited

U.S. PATENT DOCUMENTS

| | | |
|---|---|---|
| 5,854,304 A | 12/1998 | Garcia et al. |
| 2008/0087865 A1 | 4/2008 | Ferdinand et al. |
| 2008/0103232 A1 | 5/2008 | Lake et al. |
| 2009/0105371 A1 | 4/2009 | Luster-Teasley |
| 2010/0229462 A1 | 9/2010 | Garcia |
| 2014/0174724 A1 | 6/2014 | Livanec et al. |
| 2014/0220684 A1 | 8/2014 | Lim et al. |
| 2017/0029582 A1 | 2/2017 | Kuczynski et al. |

FOREIGN PATENT DOCUMENTS

| | | | |
|---|---|---|---|
| CN | 104558742 A | | 4/2015 |
| KR | 100197899 B1 | | 6/1999 |
| WO | WO 2016/013001 | * | 7/2015 |

OTHER PUBLICATIONS

Rocha et al., "Characterization and Accelerated Ageing of UHMWPE Used in Orthopedic Prosthesis by Peroxide," Materials, 2009, vol. 2, pp. 562-576.

Oh et al., "Hydrodynamic micro-encapsulation of aqueous fluids and cells via 'on the fly' photopolymerization," Journal of Micromechanics and Microengineering, 2006, vol. 16, pp. 285-291.

Unknown, "Aqueous Solution Encapsulation Into a Dry Powder Using Dry Water Technology for Personal Care Application," AVEKA, Inc., 1 page, printed from <http://www.aveka.com/aqueous-solution-encapsulation-dry-powder-personal-care-application.html> on Jun. 5, 2015.

Skinner et al., "Encapsulation and release of aqueous components from sonochemically produced protein microspheres," Chemical Communications, 2012, vol. 48, pp. 9260-9262, downloaded from <http://opus.bath.ac.uk/31427/1/Skinner_Price_microspheres_final_draft.pdf> on Jul. 6, 2015.

Skinner et al., "Encapsulation and release of aqueous components from sonochemically produced protein microspheres," Chemical Communications, 2012, vol. 48, pp. 9260-9262, [Supplementary Information, 5 pages].

Unknown, "d2w controlled-life plastic technology," Symphony Environmental Ltd, 2 pages, downloaded from <http://www.symphonyenvironmental.com/files/uploaded/environmental/d2w%20brochure%202012.pdf> on Jun. 11, 2015.

Unknown, "What is d2w?," Symphony Environmental Ltd, 2 pages, printed from <http://www.symphonyenvironmental.com/degradable/d2w-controlledlife-plastic/what-is-d2w/> on Jun. 11, 2015.

Unkown, "d2w Technical Data Sheet (TDS) Additive 93389," 1 page, downloaded from <http://ecoplastic.pl/wp-content/uploads/2013/11/TDS-93389.pdf> on Jun. 11, 2015.

Bednarz et al., "Application of Hydrogen Peroxide Encapsulated in Silica Xerogels to Oxidation Reactions," Molecules, 2012, vol. 17, pp. 8068-8078.

Laird, "Biodegradation-promoting additives for plastics don't work, says study," Plastics Today, Mar. 3, 2015, 2 pages, printed from <http://www.plasticstoday.com/articles/Biodegradation-promoting-additives-plastics-dont-work-says-study-150304> on Jun. 19, 2015.

Selke et al., "Evaluation of Biodegradation-Promoting Additives for Plastics," Environmental Science and Technology 2015, vol. 49, pp. 3769-3777.

Selke et al., "Evaluation of Biodegradation-Promoting Additives for Plastics," Environmental Science and Technology 2015, vol. 49, pp. 3769-3777, [Supplementary Materials, 27 pages].

Makadia et al., "Poly Lactic-co-Glycolic Acid (PLGA) as Biodegradable Controlled Drug Delivery Carrier," Polymers, 2011, vol. 3, pp. 1377-1397.

U.S. Appl. No. 14/811,929, to Joseph Kuczynski et al., entitled "Method to Ensure Degradation of Plastic Films in an Anaerobic Environment, Such as a Landfill" (As Amended), filed Jul. 29, 2015, assigned to International Business Machines Corporation.

List of IBM Patents or Patent Applications Treated as Related (Dated Nov. 13, 2017).

* cited by examiner

METHOD AND COMPOSITION TO ENSURE DEGRADATION OF PLASTIC FILMS IN AN ANAEROBIC ENVIRONMENT, SUCH AS A LANDFILL

CROSS-REFERENCE TO RELATED APPLICATION

This patent application is a divisional application of pending U.S. patent application Ser. No. 14/811,929, filed Jul. 29, 2015, entitled "METHOD TO ENSURE DEGRADATION OF PLASTIC FILMS IN AN ANAEROBIC ENVIRONMENT, SUCH AS A LANDFILL" (AS AMENDED), which is hereby incorporated herein by reference in its entirety.

BACKGROUND

The present invention relates in general to plastic films. More particularly, the present invention relates to plastic films that incorporate particles in which an oxidizing agent is encapsulated to ensure degradation of the plastic film in an anaerobic environment, such as a landfill. The present invention also relates to a method for producing such plastic films, as well as to articles of manufacture employing such plastic films.

SUMMARY

In accordance with some embodiments of the present invention, a plastic film is produced by blending a polymer with particles encapsulating an oxidizing agent, such as hydrogen peroxide. Optionally, an "oxodegradable" and/or "oxo biodegradable" additive that promotes degradation of the polymer in the presence of oxygen may be blended into the plastic film. The presence of the oxidizing agent within the plastic film ensures degradation of an article of manufacture, e.g., a plastic bag, when it is disposed of in an anaerobic environment, such as a landfill. In some embodiments, the particles are microcapsules and/or nanocapsules each having a polymer shell encapsulating a core that includes the oxidizing agent. In some embodiments, the particles are microparticles and/or nanoparticles each having a matrix in which the oxidizing agent is encapsulated.

BRIEF DESCRIPTION OF THE DRAWING

Embodiments of the present invention will hereinafter be described in conjunction with the appended drawing, where like designations denote like elements.

DETAILED DESCRIPTION

Figure 1:
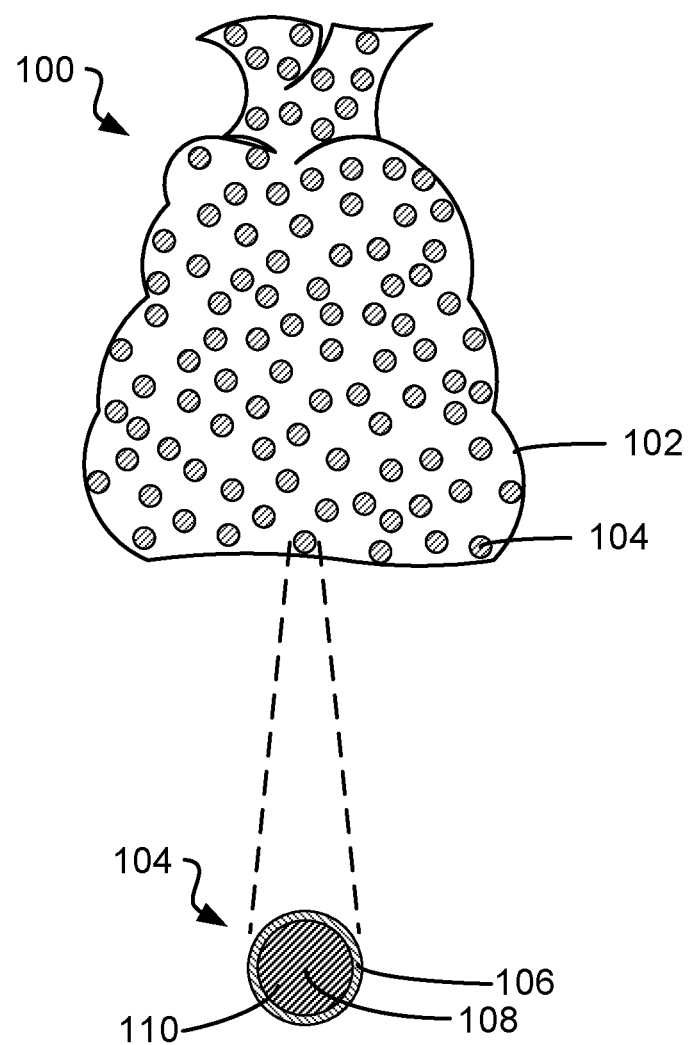
FIG. 1 is a side elevational view illustrating an exemplary polyethylene (PE) bag made of a polyethylene resin-based plastic film that incorporates microcapsules containing hydrogen peroxide in accordance with some embodiments of the present invention.

Oxodegradable plastic is made with an additive intended to cause the plastic to degrade in the presence of oxygen. Such additives, which are typically transition metal salts, are often referred to as "oxodegradable" or "oxo biodegradable" additives. These additives are often blended with one or more polymers, such as polyethylene (PE), polypropylene (PP), polystyrene (PS), polyvinyl chloride (PVC), polyethylene terephthalate (PET), and the like, to make articles of manufacture, including plastic waste bags. Most plastic waste bags, however, are intended to be deposited in landfills where not enough oxygen likely exists for the oxodegradable bags to completely degrade in the time consumers expect. In fact, in connection with warning letters sent out to 15 marketers of oxodegradable plastic waste bags, the Federal Trade Commission (FTC) on its website notes, "Contrary to the marketing, therefore, these bags may be no more biodegradable than ordinary plastic waste bags when used as intended."

In accordance with some embodiments of the present invention, a plastic film is produced by blending a polymer with particles encapsulating an oxidizing agent, such as hydrogen peroxide. Optionally, an "oxodegradable" and/or "oxo biodegradable" additive that promotes degradation of the polymer in the presence of oxygen may be blended into the plastic film. The presence of the oxidizing agent within the plastic film ensures degradation of an article of manufacture, e.g., a plastic bag, when it is disposed of in an anaerobic environment, such as a landfill. In some embodiments, the particles are microcapsules and/or nanocapsules each having a polymer shell encapsulating a core that includes the oxidizing agent. In some embodiments, the particles are microparticles and/or nanoparticles each having a matrix in which the oxidizing agent is encapsulated.

For example, microcapsules containing hydrogen peroxide ($H_2O_2$) or some other suitable oxidizing agent may be incorporated into PE. Although aspects of the present invention are described in this example in terms of single use PE bags, those skilled in the art will appreciate that the present invention may be employed in any plastic product the ultimate fate of which is to end up in a landfill (or some other anaerobic environment, such as a composting operation). Using techniques well known in the art (e.g., flat film extrusion, blown-film extrusion, hot sealing, cutting, and the like), the PE into which the microcapsules have been incorporated is formed into bags. After use, the bags are collected and sent to a landfill where the pressure exerted on the garbage is sufficient to rupture the microcapsules thereby releasing the oxidizing agent and degrading the PE. The microcapsule shell is tailored to withstand standard single use conditions (i.e., typical pressures exerted from filling the bag with garbage or consumer goods). However, under loads present in a landfill (e.g., during compaction), the microcapsule shell ruptures thereby releasing the oxidizing agent.

FIG. 1 is a side elevational view illustrating an exemplary polyethylene (PE) bag 100 made of a polyethylene resin-based plastic film 102 that incorporates microcapsules 104 containing hydrogen peroxide in accordance with some embodiments of the present invention. An enlarged cross-sectional view of one of the microcapsules 104 is also illustrated in FIG. 1. Each microcapsule 104 has a shell 106. The shell 106 of each microcapsule defines a core 108 within which a hydrogen peroxide solution 110 is encapsulated. In FIG. 1, the core 108 of each microcapsule 104 is illustrated with cross-hatched lines to denote the core 108 is filled with hydrogen peroxide solution 110.

Suitable oxidizing agents include, but are not limited to, hydrogen peroxide, permanganates, and mixtures thereof. In accordance with some embodiments of the present invention, oxidizing agents that are environmentally benign, such as hydrogen peroxide, are preferred. Permanganates suitable for use in accordance with some of the embodiments of the present invention include, but are not limited to, potassium permanganate ($KMnO_4$) and sodium permanganate ($NaMnO_4$).

The oxidizing agent is encapsulated in any suitable particle, including, but not limited to, microparticles and nanoparticles. Such particles preferably have controllable and adjustable diameters. A suitable particle diameter may be empirically determined. Typically, the particle diameter is at least one order of magnitude smaller than the thickness of the plastic film.

Microparticles are particles from 0.1 µm to 100 µm. For purposes of this document, including the claims, microparticles include composite microparticles and hollow microparticles (i.e., microcapsules). A microcapsule is a hollow microparticle having a solid shell surrounding a core-forming space available to encapsulate a substance (i.e., the oxidizing agent, in accordance with some embodiments of the present invention). The shell of the microcapsule into which the oxidizing agent is encapsulated in accordance with some embodiments of the present invention may comprise any suitable material (e.g., PLGA). The microcapsules preferably have controllable and adjustable shell thickness. A suitable shell thickness may be empirically determined. The shell thickness is typically selected so that the microcapsule will withstand standard pressures that can be exerted on the bag (or some other "degradable" packaging product) in typical consumer applications yet rupture under the high loads present in a landfill. A composite microparticle encapsulates a substance (i.e., the oxidizing agent, in accordance with some embodiments of the present invention) in its matrix. The matrix of the composite microparticle into which the oxidizing agent is encapsulated in accordance with some embodiments of the present invention may comprise any suitable material (e.g., silica xerogel).

Nanoparticles are particles smaller than 100 nm. For purposes of this document, including the claims, nanoparticles include composite nanoparticles and hollow nanoparticles (i.e., nanocapsules). A nanocapsule is a hollow nanoparticle having a solid shell surrounding a core-forming space available to encapsulate a substance (i.e., the oxidizing agent, in accordance with some embodiments of the present invention). The shell of the nanocapsule into which the oxidizing agent is encapsulated in accordance with some embodiments of the present invention may comprise any suitable material (e.g., PLGA). The nanocapsules preferably have controllable and adjustable shell thickness. A suitable shell thickness may be empirically determined. The shell thickness is typically selected so that the nanocapsule will withstand standard pressures that can be exerted on the bag (or some other "degradable" packaging product) in typical consumer applications yet rupture under the high loads present in a landfill. A composite nanoparticle encapsulates a substance (i.e., the oxidizing agent, in accordance with some embodiments of the present invention) in its matrix. The matrix of the composite nanoparticle into which the oxidizing agent is encapsulated in accordance with some embodiments of the present invention may comprise any suitable material (e.g., silica xerogel).

The particles in which the oxidizing agent is encapsulated are blended, in accordance with some embodiments of the present invention, with a polymer to produce the plastic film. This polymer may be any suitable polymer, copolymer, or polymer blend. Suitable polymers include, but are not limited to, polyethylene (PE), polypropylene (PP), polystyrene (PS), polyvinyl chloride (PVC), polyethylene terephthalate (PET), and mixtures thereof. Suitable polymers also include bio-based polymers such as polylactic acid (PLA).

When using melt blowing processes to produce film products in accordance with some embodiments of the present invention, suitable polymers include, but are not limited to, low density polyethylene (LDPE), linear low density polyethylene (LLDPE), very low density polyethylene (VLDPE), high density polyethylene (HDPE), polypropylene (PP), polybutylene (PB-1), and copolymers thereof. The average MW of LDPE ranges from approximately $2\times10^4$ to approximately $3\times10^4$. The average MW of VLDPE is less than $2\times10^4$. The average MW of HDPE ranges from approximately $3\times10^5$ to approximately $4\times10^5$. These polymers also include copolymers of ethylene such as poly (ethylene-co-vinyl acetate) (EVA), poly(ethylene-co-acrylic acid), poly(ethylene-co-methacrylic acid). These polymers further include copolymers of ethylene or propylene with lower olefins such as butene-1, pentene-1, hexene or octene. The term "polyethylene resin" as used in this document, including the claims, includes any resin where ethylene is predominant and is illustrated by the polyethylene resins in the foregoing list.

PE used for single use bags is typically either LDPE or HDPE depending on the physical properties desired (i.e., HDPE exhibits a higher strength to weight ratio relative to LDPE). The degree of crystallinity and branching determine the molecular weight distribution and density. Regardless of the grade of PE, it can be degraded using a variety of oxidizing agents. One of the most benign (from an environmental perspective) oxidizing agents is simple hydrogen peroxide. Research has shown that ultrahigh molecular weight PE (UHMWPE, average MW from approximately $5\times10^6$ to approximately $6\times10^6$) can be effectively degraded in 30 v/v % hydrogen peroxide. See, Rocha et al., "Characterization and Accelerated Ageing of UHMWPE Used in Orthopedic Prosthesis by Peroxide", Materials, 2009, Vol. 2, No. 2, 562-576. Those skilled in the art will appreciate that the oxidation kinetics for either LDPE or HDPE will be much faster than that for UHMWPE.

In accordance with some embodiments of the present invention, $H_2O_2$ or some other environmentally benign oxidizing agent is encapsulated within microcapsules, and then the encapsulated oxidizing agent is incorporated into the PE film that forms a PE bag. The shell of the microcapsule is designed to withstand standard pressures that can be exerted on the bag in typical consumer applications yet rupture under the high loads present in a landfill. Upon rupture, the $H_2O_2$ is released and begins to oxidatively degrade the PE in an otherwise anaerobic environment. The oxidizing agent is typically contained in an aqueous solution. Microencapsulation of an aqueous solution may be accomplished by a myriad of techniques known to those skilled in the art. For example, and without limitation, microencapsulation of $H_2O_2$ or some other environmentally benign oxidizing agent contained in an aqueous solution may be accomplished through the use of: water-in-oil-in-water (W/O/W) emulsion/solvent evaporation; in situ hydrolysis in combination with cross-linking; hydrodynamic phenomena (e.g., multiphase laminar flow in a micro scale channel) in combination with "on-the-fly" photopolymerization; oil-in-water-in-air "dry water" emulsion; and sonochemical technology.

Poly(lactic-co-glycolic acid) (PLGA) microspheres, for example, may be used to encapsulate the oxidizing agent in accordance with some embodiments of the present invention. PLGA microspheres may be prepared, for example, using a water-in-oil-in-water (W/O/W) emulsion/solvent evaporation process. Water-in-oil-in-water emulsion processes are also referred to as double (multiple) emulsion processes. First, a suitable amount of the oxidizing agent is dissolved in an aqueous phase (e.g., deionized (DI) water). Then, a water-in-oil emulsion is created by adding the aqueous phase containing the oxidizing agent to an organic phase containing PLGA in dichloromethane (DCM), chloroform, or some other organic solvent with vigorous stirring. Next, a W/O/W emulsion is created by adding the water-in-oil emulsion to an aqueous PVA solution with further stirring for a suitable period of time (e.g., approximately one minute). The organic solvent is subsequently allowed to evaporate, or is extracted. In the case of evaporation, the W/O/W emulsion is maintained at reduced or atmospheric pressure with stirring at a controlled rate as the organic solvent evaporates. In the case of extraction, the W/O/W emulsion is transferred to large quantity of water (optionally, with surfactant) or some other quenching medium to extract out the organic solvent. The resultant PLGA microspheres are then washed and dried. In double emulsion processes, the stirring rate and the solvent choice may be utilized to control encapsulation efficiency and final particle size. An example of such a synthetic procedure for the fabrication of PLGA microspheres is disclosed in Makadia et al., "Poly Lactic-co-Glycolic Acid (PLGA) as Biodegradable Controlled Drug Delivery Carrier", Polymers, 2011, Vol. 3, pp 1377-1397, which is hereby incorporated herein by reference in its entirety.

Hollow hydrogel capsules serve as another example of a microcapsule/nanocapsule type that may be used to encapsulate the oxidizing agent in accordance with some embodiments of the present invention. Such capsules include a hydrogel shell having a hydrolyzed and crosslinked polymerized composition. Hollow hydrogel capsules may be prepared, for example, using in situ hydrolysis and cross-linking. An example of such a synthetic procedure for the fabrication of hollow hydrogel capsules is disclosed in U.S. Patent Application Publication 2014/0174724 A1, which is hereby incorporated herein by reference in its entirety.

Polymer microcapsules made via photopolymerization serve as yet another example of a microcapsule/nanocapsule type that may be used to encapsulate the oxidizing agent in accordance with some embodiments of the present invention. Poly(4-hydroxybutyl acrylate) microcapsules (also referred to as "poly(4-HBA) microcapsules"), for example, may be used to encapsulate the oxidizing agent in accordance with some embodiments of the present invention. Poly(4-HBA) microcapsules may be prepared, for example, using hydrodynamic phenomena (e.g., multiphase laminar flow in a micro scale channel) in combination with "on-the-fly" photopolymerization of a polymerizable shell fluid, such as a solution containing 4-hydroxybutyl acrylate (4-HBA) and a suitable photoinitiator. An example of such a synthetic procedure for the fabrication of poly(4-HBA) and other polymer microcapsules is disclosed in Oh et al., "Hydrodynamic micro-encapsulation of aqueous fluids and cells via 'on the fly' photopolymerization", Journal of Micromechanics and Microengineering, 2006, Vol. 16, pp 285-291, which is hereby incorporated herein by reference in its entirety.

Modified silica microcapsules made via oil-in-water-in-air "dry water" emulsion serve as still another example of a microcapsule/nanocapsule type that may be used to encapsulate the oxidizing agent in accordance with some embodiments of the present invention. Suitable silica microcapsules include, but are not limited to, the hydrophobic fumed silica capsules commercially available under the tradename Dry Water technology from AVEKA, Inc., Woodbury, Minn., USA. These hydrophobic fumed silica capsules range from 20 µm to 200 µm in diameter.

Protein microcapsules made via sonochemical technology serve as yet still another example of a microsphere/nanocapsule type that may be used to encapsulate the oxidizing agent in accordance with some embodiments of the present invention. Lysozyme microcapsules, for example, may be used to encapsulate the oxidizing agent in accordance with some embodiments of the present invention. Lysozyme microcapsules may be prepared, for example, by layering an oil-water emulsion on the surface of a lysozyme solution, and then sonicating the layered system at the oil/water interface. An example of such a synthetic procedure for the fabrication of lysozyme microcapsules is disclosed in Skinner et al., "Encapsulation and release of aqueous components from sonochemically produced protein microspheres", Chemical Communications, 2012, Vol. 48, pp 9260-9262, which is hereby incorporated herein by reference in its entirety.

Rather than encapsulating the oxidizing agent in a microcapsule or nanocapsule, the oxidizing agent in some embodiments of the present invention is encapsulated in the matrix of a composite microparticle or a composite nanoparticle. The matrix of the composite micro- or nanoparticle into which the oxidizing agent is encapsulated may comprise any suitable material (e.g., silica xerogel). For example, hydrogen peroxide may be incorporated into a silica xerogel matrix by the sol-gel technique. An example of such a synthetic procedure for the fabrication of silica xerogel-hydrogen peroxide composite particles is disclosed in Bednarz et al., "Application of Hydrogen Peroxide Encapsulated in Silica Xerogels to Oxidation Reactions", Molecules, 2012, Vol. 17, pp 8068-8078, which is hereby incorporated herein by reference in its entirety.

In accordance with some embodiments of the present invention, a conventional "oxodegradable" and/or "oxo biodegradable" additive is used in conjunction with the encapsulated oxidizing agent to facilitate oxidation of PE. Such additives include, but are not limited to, $d_2w$ available from Symphony Environmental Ltd, Borehamwood, UK; Eco-One available from Ecologic LLC, Oshkosh, Wis., USA; Reverte available from Well Plastics Ltd, Stone, UK.

Particles encapsulating an oxidizing agent are added to a polymer, in accordance with some embodiments of the present invention, during the production of a packaging material to produce a "degradable" packaging product. The term "degradable" is used in this document, including the claims, to denote a significant difference between products of the present invention that degrade under anaerobic conditions, and conventional products that only degrade under aerobic conditions. Adding particles encapsulating an oxidizing agent to a polymer during the processing of the polymer into a desired end use product (e.g., trash bag, compost bag, merchant bag, diaper liner, wrapping film, agricultural film, twine, or packaging planks or sheets), in accordance with some embodiment of the present invention, will produce a plastic product that is environmentally degradable. Once triggered under loads present in a landfill, for example, the degradation occurs at a molecular level. That is, the triggered degradation results in a molecular weight reduction of the polymer. Heat will accelerate the degradation. Hence, the temperatures found in landfills and composting operations will serve to accelerate degradation of the plastic product.

Figure 2:
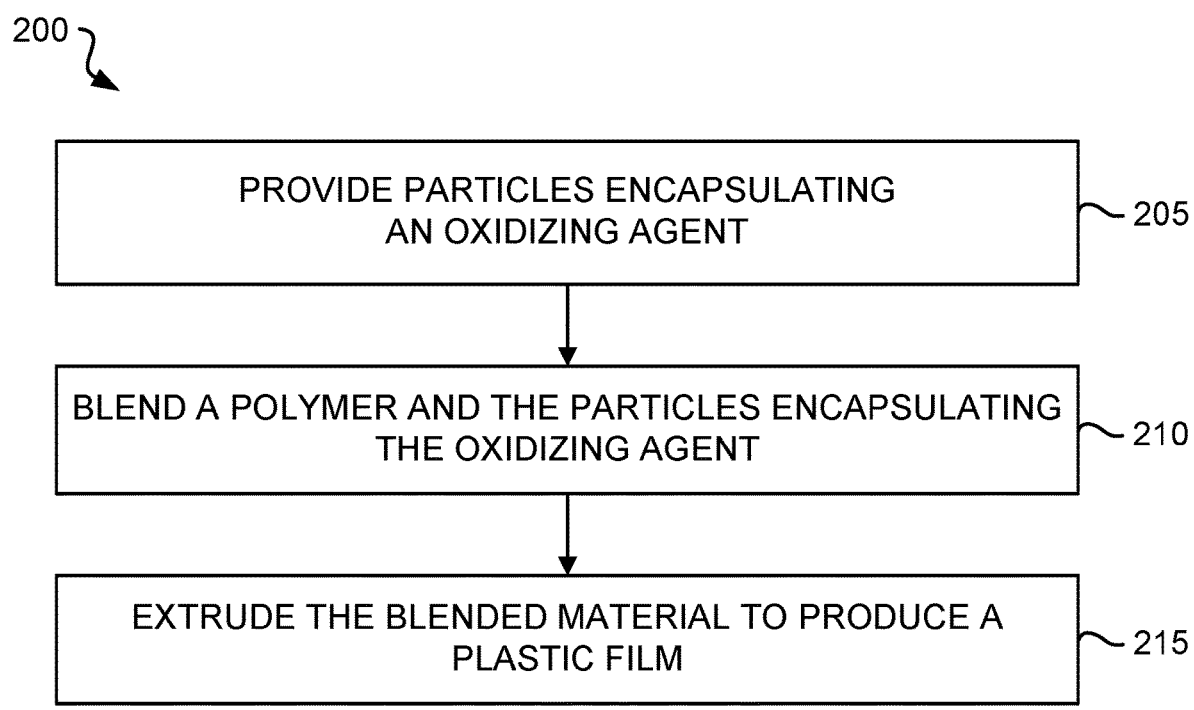
FIG. 2 is a flow diagram illustrating an exemplary method of producing a plastic film that incorporates particles encapsulating an oxidizing agent in accordance with some embodiments of the present invention.

FIG. 2 is a flow diagram illustrating an exemplary method 200 of producing a plastic film that incorporates particles encapsulating an oxidizing agent in accordance with some embodiments of the present invention. In the method 200, the steps discussed below (steps 205-215) are performed. These steps are set forth in their preferred order. It must be understood, however, that the various steps may occur simultaneously or at other times relative to one another. Moreover, those skilled in the art will appreciate that one or more steps may be omitted.

The method 200 begins by providing particles encapsulating an oxidizing agent (step 205). For example, PLGA microcapsules containing hydrogen peroxide ($H_2O_2$) may be prepared as described in prophetic example 1, below.

The method 200 continues by blending a polymer and the particles encapsulating the oxidizing agent (step 210). For example, a polyethylene resin may be blended with PLGA microcapsules containing $H_2O_2$ using any suitable blender, such as a conventional volumetric or gravimetric blender. The particles encapsulating the oxidizing agent may be blended with the polymer alone, or along with a conventional "oxodegradable" and/or "oxo biodegradable" additive.

The method 200 concludes by extruding the blended material to produce a plastic film (step 215). For example, the blended mixture may be fabricated into a PE bag using techniques well known in the art (e.g., flat film extrusion, blown-film extrusion, hot sealing, cutting, and the like). For example, the blended mixture may be fabricated into a PE bag using blown-film extrusion so as to have a desired film thickness. Typically, blown film thicknesses range between 15-500 μm.

The following prophetic examples are provided to aid the reader in understanding the present invention. The present invention, however, is not limited by these examples.

PROPHETIC EXAMPLE 1

Preparation of PLGA Microcapsules Containing $H_2O_2$

This prophetic example describes an exemplary preparation of PLGA microcapsules containing hydrogen peroxide ($H_2O_2$). In this prophetic example, PLGA microcapsules suitable for use in blending with a polymer to make a plastic film in accordance with some embodiments of the present invention are produced using water-in-oil-in-water (W/O/W) emulsion/solvent evaporation. First, 6 ml of 4% hydrogen peroxide is emulsified with 1.5 ml of poly(lactic-co-glycolic acid) (PLGA, LA:GA=50:50, MW=approximately 11,000 gmol$^{-1}$) (available from Boehringer Ingelheim GmbH, Ingelheim, Germany) dissolved in dichloromethane (DCM) and followed by 4 ml of 3.5% polyvinyl alcohol (PVA). The mixture is stirred at room temperature for 4 hours to allow evaporation of the organic solvent, thus preparing PLGA microcapsules containing hydrogen peroxide.

Preparation of PE Bag Incorporating PLGA Microcapsules Containing $H_2O_2$

The PLGA microcapsules containing hydrogen peroxide are blended with polyethylene (PE). A suitable concentration of the PLGA microcapsules in the blend may be empirically determined. Typically, loading levels of the PLGA microcapsules between 0.5%-5% are suitable. The PLGA microcapsules may be blended with the PE alone, or along with a conventional "oxodegradable" and/or "oxo biodegradable" additive. For example, the PLGA microcapsules (which, in this prophetic example, contain 4% hydrogen peroxide) and $d_2w$ (available from Symphony Environmental Ltd, Borehamwood, UK) may be blended with PE, at 5% and 1% loading levels, respectively. The blended mixture is then fabricated into a PE bag using techniques well known in the art (e.g., flat film extrusion, blown-film extrusion, hot sealing, cutting, and the like). For example, the blended mixture may be fabricated into a PE bag using blown-film extrusion so as to have a desired film thickness. Typically, blown film thicknesses range between 15-500 μm.

PROPHETIC EXAMPLE 2

Preparation of Poly(4-HBA) Microcapsules Containing $H_2O_2$

This prophetic example describes an exemplary preparation of poly(4-HBA) microcapsules containing hydrogen peroxide ($H_2O_2$). In this prophetic example, poly(4-HBA) microcapsules suitable for use in blending with a polymer to make a plastic film in accordance with some embodiments of the present invention are produced using a conventional microcapsule-fabrication apparatus (MCFA). An exemplary MCFA is disclosed in the Oh et al. article, discussed above. The MCFA employs three pipettes, including two pulled micropipettes (i.e., an inlet pipette (IN-pipette) and an intermediate pipette (IM-pipette)) and one normal (non-pulled) outlet pipette (O-pipette), each coaxially bonded within a center hole of a polydimethylsiloxane (PDMS) substrate. An aluminosilicate glass micropipette having inner and outer diameters of 0.5 mm and 1 mm, respectively, and a length of 4 cm may be used to make the pulled micropipettes, as well as the O-pipette. The MCFA has three inlets (i.e., the IN-pipette, an injection port into the center hole of the PDMS substrate between IN-pipette and IM-pipette, and another injection port into the center hole of the PDMS substrate between the IM-pipette and the O-pipette) into which are introduced, respectively, three fluids (i.e., the core fluid, the photopolymerizable shell fluid, and the sheath fluid). These three fluids may be introduced into the three inlets using syringe pumps, for example. The transition or capsulated flow through the O-pipette is exposed to ultraviolet (UV) radiation (e.g., 365 nm having an intensity of 300 mW cm$^{-2}$) to solidify (photopolymerize) the photopolymerizable shell fluid as it passes through the O-pipette. UV light radiated directly onto the O-pipette rapidly polymerizes the microcapsules travelling therethrough.

In this prophetic example, the core fluid introduced into the MCFA is 30 wt % hydrogen peroxide. More generally, the core fluid may be any suitable oxidizing agent. In this prophetic example, the photopolymerizable shell fluid introduced into the MCFA is a solution of 4-hydroxy butyl acrylate (4-HBA) and a suitable photoinitiator, such as 2,2-dimethoxy-2-phenylacetophenone (DMPA) (3.42 wt %). More generally, the photopolymerizable shell fluid may be any suitable fast polymerizable solution. Another example of a suitable fast polymerizable solution for use as the photopolymerizable shell fluid is a solution of 4-hydroxy butyl acrylate (4-HBA), acrylic acid (AA) (13.84 wt %), a suitable cross-linker, such as ethylene glycol dimethylacrylate (EGDMA) (0.96 wt %), and a suitable photoinitiator, such as 2,2-dimethoxy-2-phenylacetophenone (DMPA) (3.42 wt %). In this prophetic example, the sheath fluid introduced into the MCFA is a solution of polyvinyl alcohol (PVA) (25 vol %) and deionized (DI) water (75 vol %). More generally, the sheath fluid may be any suitable solution. Use of an aqueous solution as the sheath fluid is advantageous in that it allows for water solubility. Hence, any remnant of such an aqueous solution on the surface of the solidified microcapsules can be easily removed by rinsing with water.

The inner and outer diameters of the microcapsules can be varied according to the flow rates of the three fluids (i.e., the core fluid, the photopolymerizable shell fluid, and the sheath fluid) introduced into the MCFA. For example, the core fluid flow rate dominantly affects the inner diameter of the microcapsules. As the core fluid flow rate increases, the inner diameter of the microcapsules increases while the outside diameter of the microcapsules remains largely unaffected. The photopolymerizable shell fluid flow rate affects the thickness of the shell. As the photopolymerizable shell fluid flow rate increases, the inner diameter of the microcapsules decreases while the outer diameter of the microcapsules increases. The sheath fluid flow rate dominantly affects the outer diameter of the microcapsules. As that sheath fluid flow rate increases, the outer diameter of the microcapsules decreases while the inner diameter of the microcapsules also decreases but more slowly.

Preparation of PE Bag Incorporating Poly(4-HBA) Microcapsules Containing $H_2O_2$ The poly(4-HBA) microcapsules containing hydrogen peroxide are blended with polyethylene (PE). A suitable concentration of the poly(4-HBA) microcapsules in the blend may be empirically determined. Typically, loading levels of the poly(4-HBA) microcapsules between 0.5%-5% are suitable. The poly(4-HBA) microcapsules may be blended with the PE alone, or along with a conventional "oxodegradable" and/or "oxo biodegradable" additive. For example, the poly(4-HBA) microcapsules (which, in this prophetic example, contain 30 wt % hydrogen peroxide) and $d_2w$ (available from Symphony Environmental Ltd, Borehamwood, UK) may be blended with PE, each at a 1% loading level. The blended mixture is then fabricated into a PE bag using techniques well known in the art (e.g., flat film extrusion, blown-film extrusion, hot sealing, cutting, and the like). For example, the blended mixture may be fabricated into a PE bag using blown-film extrusion so as to have a desired film thickness. Typically, blown film thicknesses range between 15-500 μm.

PROPHETIC EXAMPLE 3

Preparation of Lysozyme Microcapsules Containing $H_2O_2$

This prophetic example describes an exemplary preparation of lysozyme microcapsules containing hydrogen peroxide ($H_2O_2$). In this prophetic example, lysozyme microcapsules suitable for use in blending with a polymer to make a plastic film in accordance with some embodiments of the present invention are produced using sonochemical technology. First, an oil-water emulsion (40% aqueous phase) is prepared with an oil phase of tetradecane containing 4 wt % Span 80 nonionic surfactant (available from Sigma-Aldrich Co. LLC, St. Louis, Mo., USA) and an aqueous phase of 30 wt % hydrogen peroxide and sonicated with the horn tip placed at the oil/water interface for 5 minutes using an intensity of 45 W cm$^{-2}$. Next, a lysozyme solution is prepared in a 15 mL plastic centrifuge tube by dissolving 50 mg of lysozyme (available from Sigma-Aldrich Co. LLC) in 1 mL of 50 mM pH 8 Tris buffer (available from Sigma-Aldrich Co. LLC) and left to stand for 1 hour, and then 30 mg of dithiothreitol (DTT) (available from Sigma-Aldrich Co. LLC) is charged to the lysozyme solution and left to stand for 2 minutes. Lysozyme microcapsules are then prepared by layering 100 μL of freshly prepared oil-water emulsion on the surface of the lysozyme solution and sonicating with the horn tip placed at the oil/water interface for 30 s using an intensity of 14 W cm$^{-2}$. After sonication, the suspension is diluted to 15 mL with deionized water and left to stand overnight. The suspension of microspheres are washed, to remove excess oil and protein fragments.

Preparation of PE Bag Incorporating Lysozyme Microcapsules Containing $H_2O_2$

The lysozyme microcapsules containing hydrogen peroxide are blended with polyethylene (PE). A suitable concentration of the lysozyme microcapsules in the blend may be empirically determined. Typically, loading levels of the lysozyme microcapsules between 0.5%-5% are suitable. The lysozyme microcapsules may be blended with the PE alone, or along with a conventional "oxodegradable" and/or "oxo biodegradable" additive. For example, the lysozyme microcapsules (which, in this prophetic example, contain 30 wt % hydrogen peroxide) and $d_2w$ (available from Symphony Environmental Ltd, Borehamwood, UK) may be blended with PE, each at a 1% loading level. The blended mixture is then fabricated into a PE bag using techniques well known in the art (e.g., flat film extrusion, blown-film extrusion, hot sealing, cutting, and the like). For example, the blended mixture may be fabricated into a PE bag using blown-film extrusion so as to have a desired film thickness. Typically, blown film thicknesses range between 15-500 μm.

PROPHETIC EXAMPLE 4

Preparation of Silica Xerogel-$H_2O_2$ Composite Particles

This prophetic example describes an exemplary preparation of silica xerogel-hydrogen peroxide ($H_2O_2$) composite particles. In this prophetic example, silica xerogel-hydrogen peroxide composite particles suitable for use in blending with a polymer to make a plastic film in accordance with some embodiments of the present invention are produced using sol-gel processing. In this prophetic example, silicic acid is obtained from water glass by utilizing a bed of cation-exchange resin. Those skilled in the art will appreciate that silicic acid may be otherwise obtained, e.g., commercially. First, a solution is prepared by diluting 4 g of water glass (R-145 available from Cazet Kampinos Zaklad Chemii Budowlanej, Lazy, Poland) in 16 g of distilled water, and this solution is passed through a bed of cation-exchange resin (Amberlite, 80 g) in a glass column (O.D.=25 mm, H=600 mm). The bed is then washed with distilled water (40 mL) and effluents were combined and mixed with 20 mL of 30 wt % hydrogen peroxide. The sol is poured onto a Petri dish and dried under a hood at room temperature for 48 h and yields 5-10 g of silica xerogel-hydrogen peroxide composite.

Preparation of PE Bag Incorporating Silica Xerogel-$H_2O_2$ Composite Particles

The silica xerogel-hydrogen peroxide composite particles are blended with polyethylene (PE). A suitable concentration of the silica xerogel-hydrogen peroxide composite particles in the blend may be empirically determined. Typically, loading levels of the silica xerogel-hydrogen peroxide composite particles between 0.5%-5% are suitable. The silica xerogel-hydrogen peroxide composite particles may be blended with the PE alone, or along with a conventional "oxodegradable" and/or "oxo biodegradable" additive. For example, the silica xerogel-hydrogen peroxide composite particles (which, in this prophetic example, contain 40% hydrogen peroxide) and $d_2w$ (available from Symphony Environmental Ltd, Borehamwood, UK) may be blended with PE, at 5% and 1% loading levels, respectively. The blended mixture is then fabricated into a PE bag using techniques well known in the art (e.g., flat film extrusion, blown-film extrusion, hot sealing, cutting, and the like). For example, the blended mixture may be fabricated into a PE bag using blown-film extrusion so as to have a desired film thickness. Typically, blown film thicknesses range between 15-500 μm.

Those skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. An article of manufacture, comprising:
a plastic film comprising a polymer blended with particles encapsulating an oxidizing agent, wherein the oxidizing agent is selected from the group consisting of hydrogen peroxide, permanganates, and mixtures thereof.

2. The article of manufacture as recited in claim 1, wherein the oxidizing agent comprises hydrogen peroxide.

3. The article of manufacture as recited in claim 1, wherein the particles comprise at least one of microcapsules and nanocapsules each having a shell encapsulating a core comprising the oxidizing agent.

4. The article of manufacture as recited in claim 3, wherein the oxidizing agent comprises hydrogen peroxide.

5. The article of manufacture as recited in claim 1, wherein the particles comprise at least one of microparticles and nanoparticles each having a matrix encapsulating the oxidizing agent.

6. The article of manufacture as recited in claim 5, wherein the oxidizing agent comprises hydrogen peroxide.

7. An article of manufacture, comprising:
a plastic film comprising a polymer blended with particles encapsulating an oxidizing agent, wherein the plastic film further comprises at least one of an "oxodegradable" and "oxo biodegradable" additive blended with the polymer and the particles encapsulating the oxidizing agent, wherein the additive promotes degradation of the polymer in the presence of oxygen.

8. The article of manufacture as recited in claim 1, wherein the polymer comprises a polyethylene resin.

9. The article of manufacture as recited in claim 8, wherein the article of manufacture is a plastic bag.

10. The article of manufacture as recited in claim 1, wherein the polymer is selected from the group consisting of polyethylene (PE), polypropylene (PP), polystyrene (PS), polyvinyl chloride (PVC), polyethylene terephthalate (PET), and mixtures thereof.

11. The article of manufacture as recited in claim 1, wherein the particles encapsulating an oxidizing agent include poly(lactic-co-glycolic acid) (PLGA) microcapsules containing hydrogen peroxide.

12. The article of manufacture as recited in claim 1, wherein the particles encapsulating an oxidizing agent include poly(4-hydroxy butyl acrylate) microcapsules containing hydrogen peroxide.

13. The article of manufacture as recited in claim 1, wherein the particles encapsulating an oxidizing agent include lysozyme microcapsules containing hydrogen peroxide.

14. The article of manufacture as recited in claim 1, wherein the particles encapsulating an oxidizing agent include silica xerogel-hydrogen peroxide composite particles.

15. An article of manufacture, comprising:
a plastic film comprising a polymer blended with particles encapsulating an oxidizing agent, wherein the particles encapsulating an oxidizing agent include poly(4-hydroxy butyl acrylate) microcapsules containing hydrogen peroxide produced using ultraviolet (UV) light to polymerize a photopolymerizable shell fluid comprising 4-hydroxy butyl acrylate and a photoinitiator.

* * * * *